United States Patent Office 3,450,662
Patented June 17, 1969

3,450,662
ANIONIC LACTAM CATALYST SYSTEM
Paul A. Tierney, Ballwin, Mo., assignor to Monsanto Company, St. Louis, Mo., a corporation of Delaware
No Drawing. Filed Nov. 18, 1966, Ser. No. 595,334
Int. Cl. C08g 20/18; B01j 11/00; C08k 1/84
U.S. Cl. 260—30.8       18 Claims

ABSTRACT OF THE DISCLOSURE

A solution of a metal lactam dissolved in a sulfoxide of the formula $$R-\overset{\overset{O}{\|}}{S}-R_1$$

where R and $R_1$ can be any monovalent hydrocarbon radical and where the R's can be joined together to form a heterocyclic ring. Also described is a process for preparing the above solution. Further described is a base-catalyzed substantially anhydrous lactam polymerization process employing as a catalyst the above described solution of metal lactam in said sulfoxide.

---

This invention relates to the anionic base-catalyzed substantially anhydrous polymerization of lactams to form polyamides. In one aspect, this invention relates to the basic anionic catalyst used in the polymerization. More particularly, one aspect of this invention relates to a solvent for the anionic catalyst and to a process for polymerizing lactams using the solution of anionic catalyst.

United States Patents 3,017,391 and 3,017,392 describe a process for polymerizing lactams using as a catalyst precursor a substance capable of forming an iminium salt upon reaction with the monomeric lactam, e.g.

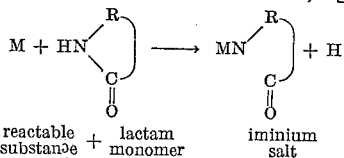

reactable + lactam → iminium
substance   monomer    salt

The iminium salt is the active catalyst of the lactam polymerization system. The patents mentioned above set forth several reactable substances which form iminium salts upon reaction with the lactam monomer as well as several iminium salts themselves. Some of the iminium salts suggested are the alkali metal lactams such as lithium, sodium and potassium lactams, the alkaline earth metal lactams such as magnesium, calcium, strontium and barium lactams, zinc lactam and aluminum lactam.

In any large volume process utilizing techniques described in the above patents, the efficient mixing of monomer, initiator, catalyst, and other additives prior to gelation of the system becomes of major importance. One method has been to mix together monomer, initiator and all other additives except catalyst, then add catalyst to the monomer system when polymerization is desired. When initiated monomer is prepared in large batches, catalyzed, and immediately cast into relatively small molds which permits little or no mixing after casting, the catalyst is preferably added through some sort of mixing head. Failure to achieve adequate mixing results in longer polymerization times, incompletely polymerized products, low molecular weight polymer in the product and otherwise generally unsatisfactory compositions.

Recent developments in the area of anionic lactam polymerization permit the preparation of reinforced polylactam compositions having mechanical properties far superior to the unreinforced polylactam. The reinforcement is achieved through the adhesive bonding of organo-silane-treated inorganic materials to the polylactam. Addition of sufficient inorganic to optimize the mechanical properties of the polymerized compositions, however, increases viscosity of the monomer slurry and makes mixing of catalyst and initiated monomer-inorganic slurry even more difficult. Further, some of the catalysts such as sodium lactam and magnesium lactam which provide reinforced polymeric compositions with the best mechanical properties can only be mixed with the monomer slurry with considerable difficulty because of their normally solid nature at room temperature. To achieve adequate mixing, the mixing head and all lines leading from the catalyst source must be heated in order to obtain a fluid material. At high temperatures, hydrolysis of the catalyst by trace amounts of water or initiation of the catalyst by trace amounts of carbon dioxide can lead to viscosity build-up and gelation of the catalyst stream in the mixing head or in the line leading to the head. Other catalyst precursors which react with lactam monomer to give an iminium salt can of course be used in place of the solid alkali metal or alkaline earth metal lactam. A Grignard reagent such as ethylmagnesium bromide is an example of such a material. The Grignard reagents, however, upon reaction with lactam monomer may produce gaseous byproducts such as ethane in the case of ethylmagnesium bromide. The gaseous byproducts must be removed from the slurry prior to gelation to provide compositions with smooth void-free surfaces. Alkali metal halides are further examples of polymerization catalysts which provide polylactams with good mechanical properties, but which are quite difficult to use in a large scale polymerization. Alkali metal hydrides such as sodium hydride are normally solid at room temperature and are so highly reactive at or near their melting point of 200 to 300° C. that their use in liquid form is intolerable. In addition, the metal hydrides, upon catalyzing a lactam polymerization, evolve a gaseous byproduct, hydrogen, which must be removed prior to gelation of the monomer.

A lactam polymerization catalyst system capable of overcoming the difficulties described above would be a welcome addition to the art. To alleviate or eliminate the above described problems, the catalyst system must be such that no gas evolution takes place upon addition of the catalyst to the monomer. The catalyst must, of course, induce a rapid polymerization producing a finished cast article with good mechanical properties. In addition, the catalyst should be a liquid at or near room temperature, be reasonably stable to the effects of trace amounts of water and carbon dioxide while in the liquid condition and should have a reasonably long shelf life. Providing a catalyst system capable of performing in the above manner constitutes the principal object of this invention. Another important object of this invention is the provision of a lactam polymerization using the catalyst system. Yet another object is the provision of a new process for preparing a solution of metal lactam with an unusually advantageous combination of properties. Additional objects, benefits and advantages will become apparent as the detailed description of the invention proceeds.

The improved catalyst system suggested for use in a base-catalyzed substantially anhydrous lactam polymerization comprises a metal lactam dissolved in a disubstituted sulfoxide of the formula $$R-\overset{\overset{O}{\|}}{S}-R_1$$

where R and $R_1$ can be any monovalent hydrocarbon radical and where the R's can be joined together to form a heterocyclic ring. Preferred catalyst solutions are those that are liquid at or near 100° C. The lower the temperature at which the catalyst solution can be maintained, the less likely it is to deteriorate and lose its activity. Hence, catalyst solutions which are liquid at temperatures of 80° C. or less are particularly useful.

The metal lactam can be any metal lactam. Alkali metal lactams such as sodium or potassium lactam constitute one preferred group. Metal lactams containing metals less electropositive than the alkali metals can also be used even though their use results in lengthened polymerization times. Such metal lactams are particularly preferred for use herein when modified by reaction wtih a source of halogen as described in copending patent application Ser. No. 507,682, filed Nov. 15, 1965. Examples of such metal lactams include magnesium lactam and aluminum lactam. When the above catalyst components are reacted with a source of halogen, it is postulated that the resultant active catalyst has the formula

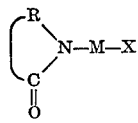

where M is a metal, X is a halogen atom or atoms and R is an alkylene chain. The lactam component of the metal lactam can be any lactam, for example pyrrolidone, piperidone, caprolactam, capryllactam and dodecanone isoxime. Oftentimes the lactam component will be identical to the particular monomer being polymerized, but such a restriction is by no means essential. Concentrations of metal lactam are conveniently expressed in terms of millimoles per mole of monomer. Workable concentration can range from 0.1 millimole per mole of monomer or less up to 200 millimoles per mole of monomer or more. If a source of halogen is used to modify the reactivity of the metal lactam catalyst, the teachings set forth in copending patent application Ser. No. 507,682, filed Nov. 15, 1965, can be used in conjunction with the examples set forth herein to provide acceptable catalyst systems.

The solvent for the catalyst is the most important feature of the present invention. Discovery of a suitable solvent for the lactam polymerization catalyst has made possible the elimination of one entire step from the casting process and has simplified the execution of several other steps in the process. In addition, the use of solvents described herein has facilitated the preparation of lactam polymerization catalyst having increased activity and storage stability. Solvents useable herein are the disubstituted sulfoxides having the formula set forth above. The R groups can be hydrocarbon groups of any size, but preferably have no more than 20 carbon atoms and more preferably no more than 10 carbon atoms. Suitable R groups include alkyl, alkenyl, alkynyl, aryl, alkaryl, aralkyl, and condensed ring aryl groups. Preferred R groups are phenyl groups or alkyl groups having up to about four carbon atoms. Of course, the R groups can be further substituted with additional groups, containing no active hydrogen atoms, which do not interfere with a lactam polymerization such as carbonyl groups. Examples of solvents include dimethyl sulfoxide, ethylisopropyl sulfoxide, dioctyl sulfoxide, diphenyl sulfoxide, phenylmethyl sulfoxide, dibenzyl sulfoxide, di-p toluene sulfoxide, cyclopentyl sulfoxide, vinylmethyl sulfoxide, diallyl sulfoxide, napthylphenyl sulfoxide, and others. As mentioned above, catalyst solutions which are liquid at temperatures of 80° C. or less are particularly preferred. Such solutions which are liquid at low temperatures can be prepared by selecting a solvent from the above-described class which is itself a liquid at the low temperature. The melting points of such compounds can be easily ascertained from the literature.

The relative proportions of solvent and active catalyst in the catalyst solution will vary depending upon a number of factors such as the solubility of one particular catalyst in one particular solvent, the temperature at which the catalyst solution will be metered into the monomer, and the ease with which the monomer and catalyst can be mixed together. In general, liquid solutions containing 50% or more by weight of active catalyst can be prepared especially if the solution can be maintained at some temperature above 80 or 100° C. Usually, solutions containing 25 or 30% by weight of sodium caprolactam or magnesium caprolactam in disubstituted sulfoxides at room temperature can be prepared. Of course, solutions much more dilute can also be used satisfactorily.

Discovery of a suitable solvent for the metal lactam has also made possible the preparation of an active catalyst in liquid form which has good storage stability. Conventional synthesis of a liquid catalyst solution prior to this invention required the preparation of the metal lactam in excess lactam. Following reaction of metal and lactam, volatile reaction products were removed by distillation along with some lactam solvent. This lactam, having an elevated melting point, e.g. caprolactam melts at 69° C., solidified in the distillation lines unless the lines were heated and the distillation carried out at high temperature. The high temperature, combined with even trace amounts of water or carbon dioxide, resulted in gelation of the solution because of partial polymerization of the solution or in reduction of the catalytically active metal lactam to the catalytically inactive alkyl amine. Further, the catalyst solution after preparation had a relatively short shelf life ranging from a few hours to a few days and often had a reduced catalytic activity. The process of the present invention achieves in the prepared catalyst solution the paradoxical combinaton of both increased and decreased activity, regarding its catalytic effect and storage stability respectively. The process for preparing the lactam polymerization catalyst comprises reacting a metal hydride, metal hydroxide, metal alkyl, metal alkoxide, metal amide, metal carbonate, etc. with a lactam monomer in the presence of a disubstituted sulfoxide of the formula

where R and $R_1$ can be any monovalent hydrocarbon radical and where the R's can be joined together to form a heterocyclic ring. The reaction in the presence of the sulfoxide solvent is followed by removal of volatile reaction products. One useful procedure has been to contact the metal with water or alcohol, and then to add the solvent and lactam monomer. The hydroxide or alkoxide group of the metal compound is displaced by the lactam. Reaction of the metal hydroxide or alkoxide with the lactam can be accelerated by application of heat to the mixture, after which time the alcohol or water is removed by distillation, optionally under reduced pressure. Alternatively, the catalyst solvent can be withheld until the reaction of metal compound and lactam is complete, after which time the solvent can be added and reaction products and excess reactants removed. To insure complete removal of all volatiles, it is often desirable to continue the distillation until some portion of the solvent is also removed. As mentioned above, metal hydrides and metal alkyls can also be used in the instant process. The choice of which metal compound to react with a lactam will depend to some extent upon the reaction conditions. For instance a magnesium alkyl can be added directly to a lactam monomer to form quickly the corresponding magnesium lactam. A magnesium alkoxide can be expected to react more slowly. An aluminum alkoxide, however, reacts so slowly that the use of an aluminum alkyl to form the aluminum lactam is definitely preferred. Similarly, the reaction of most metals other than the alkali metals, magnesium and aluminum with a lactam will benefit from the use of metal alkyl or hydrides to produce a satisfactory quantity of the metal lactam. Reaction temperatures can vary from room temperature or less up to 200° C. or more and pressures from subatmospheric to several hundred pounds per square inch. Reaction times can also vary considerably from a few seconds to several hours. If a metal alkyl or alkoxide is employed, the alkyl or alkoxy group can be of any size or degree of branching although relatively straight-chained groups having up to about 20 carbon atoms are preferred. Preferred reaction conditions for the alkali metal, magnesium and aluminum compounds with ε-caprolactam are usually in the area of 50 to 150° C. at atmospheric pressures for from about 10 minutes to an hour.

The third feature of the present invention is the improvement in base-catalyzed, substantially anhydrous lactam polymerization made possible by the novel catalyst solutions described herein. In its broadest application, the improvement comprises, prior to addition of said catalyst to said monomer, dissolving a metal lactam polymerization catalyst in a disubstituted sulfoxide of the formula

where R and $R_1$ can be any monovalent hydrocarbon radical and where the R's can be joined together to form a heterocyclic ring. As recognized by many skilled artisans, there are several acceptable lactam polymerization catalysts which need not be added to the monomer in liquid form to produce an acceptable polymeric product. But many of the catalytic additives, such as sodium hydride, potassium hydride, magnesium methoxide, triethyl aluminum, ethyl magnesium bromide and methyl magnesium chloride erect with monomeric lactam to give volatile reaction products such as hydrogen, methane, ethane, methanol and ethanol. The volatile materials must be removed from the monomer prior to gelation to provide bubble-free products with uniform properties. Removal of the volatiles usually requires an evacuation step prior to polymerization which can consist of distillation under reduced pressure. If the monomer mixture is viscous because of partial polymerization or because of the large amount of additives such as inorganic reinforcing agent, the problem of volatiles removal is increased. If the catalytic precursors are prereacted with the monomer to form the active iminium salt in the absence of any initiator or other additives, the volatiles can be removed from the catalyst prior to its addition to the monomer. But metal lactams are solids and can only be dispersed with difficulty in a viscous monomer slurry. If dissolved in a small portion of monomer prior to addition to the monomer slurry, the catalyst can be dispersed if heated to 100 to 200° C. to keep it in liquid form. But at elevated temperatures, the catalyst is very susceptible to degradation or autocatalysis if trace amounts of water or carbon dioxide are present. The present invention obviates all the above difficulties. It further provides a catalyst which produces cast polymers with good mechanical properties, an important feature of this invention.

One preferred process comprises adding initiator, stabilizer, pigments, dyes, fillers, reinforcing agents or other additives to the molten monomer and mixing the catalyst solution of this invention with the monomer slurry as it is cast into heated molds. To shorten residence time in the molds, the initiated monomer slurry can also be preheated to an acceptable polymerization temperature before casting. Ample distribution of catalyst in the monomer can be assured by use of a mixing head. The other additives can be added in any order but efficient dispersion of filler or reinforcing agent, if used, can be facilitated by adding them along with any dispersing aids first, followed by the initiator and then followed by the catalyst solution. As mentioned, the order of addition of the various additives to the lactam monomer can be altered in any manner desired. For instance, the catalyst solution and initiator can be added simultaneously to the monomer, and filler subsequently added or the entire batch of ingredients can be mixed together at some reduced temperature of 80 or 90° C. and then heated rapidly to polymerization temperature and cast into molds. Other orders of addition are also included within the scope of the present polymerization process.

One important type of additive used in the practice of preferred embodiments of this invention are the fillers or reinforcing agents. As amply described in copending U.S. patent application Ser. No. 560,247, filed June 24, 1966, incorporated herein by reference, the incorporation of inorganic reinforcing agents into the polymerized product represents an important advance in the art. Although the present invention is quite useful in the production of unfilled polymeric shapes, it is particularly applicable in the manufacture of highly filled or reinforced polymers. This is so because of the increase in viscosity of a monomer slurry containing a solid phase and its consequent effect on thorough distribution of additives to the slurry. The term filler as used herein refers to any normally solid, non-polymerizable substance which can be dispersed in a polymer. Although fillers can vary in shape from granular through acicular to fibrous, dispersion in a polymer will require that the filler be small enough to be encapsulated by the polymer matrix forming the finished object. For most purposes, it is desirable that the filler have a low water solubility, preferably not exceeding about 0.15 grams per liter. Examples include materials selected from a wide variety of clays such as montmorillonite, kaolinite, bentonite, hectorite, beidellite and attapulgite, other minerals and mineral salts such as chrysolite, laumina, saponite, hercynite, feldspar, quartz, wollastonite, mullite, kyanite, cristobalite, chrysotile, crocidolite, limestone, mica, spodumene and garnet, metals such as aluminum, tin, lead, magnesium, calcium, strontium, barium, titanium, zirconium, vanadium, chromium, manganese, iron, cobalt, nickel, copper, zinc, metal oxides such as oxides of the foregoing metals, metal salts such as ferric phosphate, mercuric phosphate, lead phosphate, ferric aluminate and zinc aluminate, siliceous non-mineral substances such as precipitated calcium carbonate, silica gel, fume silica, glass fibers, fibrous aluminum silicate of the formula $Al_2SiO_5$ and glass flakes, cellulosic materials such as wood chips, sawdust, wood flour, cotton fibers and cotton floc, other organic materials such as thermosetting and other thermoplastic polymers in granular or fibrous form, and miscellaneous materials such as graphite whiskers, carbon filaments, silicon crystals, silicon carbide and the like.

Those fillers set forth above which have or can acquire hydroxyl groups attached to their surfaces can be converted into reinforcing adducts by reaction with a coupling agent. The term reinforcing adduct refers to the reaction product of a filler with a coupling agent. Fillers particularly preferred for conversion into reinforcing adducts are those siliceous materials characterized by a somewhat refractory nature with a melting point above 800° C., a Moh's hardness of at least 4, a water solubility of less than 0.1 gram per liter and a 3-dimensional crystal configuration as opposed to a 2-dimensional or planar crystal configuration possessed by some clays. Particularly preferred for use in the process of this invention are those fillers or reinforcing agents described above which have a length to diameter ratio ($l/d$) of about 25 to 1 or less. Quantities of reinforcing adduct, their sizes and shapes, types and quantities of coupler and methods of combination with fillers to form reinforcing adducts are amply described in copending U.S. patent application Ser. No. 413,456, filed Nov. 24, 1964, now U.S. Patent 3,386,943, hereby incorporated by reference. Also described are a number of other additives and techniques which can be used herein to prepare a polymeric shape of high quality, cast directly from a monomer. Coupling agents referred to above are polyfunctional compounds having at least one functional group capable of reacting with hydroxyl groups and at least one functional group capable of chemically reacting with a polylactam or polymerizing lactam monomer. Particularly preferred coupling agents for use in the preparation of reinforced polylactams are those organosilanes having both alkoxy groups and lactam-reactive functional groups attached to the silicon atom. Examples of preferred couplers include methyl-γ-trimethoxysilyl propionate and 3-aminopropyltriethoxy silane.

The patent art contains several disclosures relating to base-catalyzed lactam polymerization. Among them are U.S. 3,017,391, U.S. 3,017,392, U.S. 3,018,273, U.S. 3,028,369, U.S. 3,086,962 and U.S. 3,120,503. The above references disclose various initiators, regulators and reaction conditions for carrying out a base-catalyzed lactam polymerization. In general, the reaction components and reaction conditions described in the above patents are as equally suitable for the catalyst system described herein as they are for the catalyst systems set forth in the above patents.

The above invention will be more clearly understood in view of the following detailed examples. Quantities set forth below are expressed as parts or percent by weight unless otherwise stated.

EXAMPLE 1

To 81 grams of freshly distilled dimethyl sulfoxide is added 23.8 grams (0.21 mole) of caprolactam and 10.8 grams (0.2 mole) of sodium methoxide. The caprolactam and sodium methoxide dissolve as the mixture is heated to 130° C. Methyl alcohol is distilled off under reduced pressure at 130° C. along with 20 grams of dimethyl sulfoxide. The residual pale amber solution is cooled to room temperature, crystallizing at 80 to 85° C. The solid solution can be reheated to the liquid state and maintained at 95 to 100° C. for at least one week without any evidence of sludge formation or discoloration.

EXAMPLE 2

To 95 grams of dimethyl sulfoxide is added 6 grams of sodium metal and 35 grams of ε-caprolactam. The reactants are heated to 100° C. to produce a smooth reaction. Following completion of the reaction, the solution is refluxed for 15 minutes. The solution solidifies upon cooling and can be reconverted to a liquid by heating to 80° C. Storage of the solution at room temperature for 30 days or at 110° C. for 10 days produces no appreciable change.

EXAMPLE 3

Example 2 is followed except that 150 grams of phenyl methyl sulfoxide is used in place of dimethyl sulfoxide. The resultant solution is a clear liquid down to 100° C. Storage at room temperature or at 110° C. for 30 days produces no noticeable change.

EXAMPLE 4

To a solution of 10 grams of magnesium dissolved in 300 ml. of methanol is added 102 grams of caprolactam. Methanol is distilled from the mixture at 125° C. until a white precipitate forms. To the residue in the reaction vessel is added 100 grams of diethyl sulfoxide and the distillation is continued. An additional 50 grams of diethyl sulfoxide is added and the residual methanol removed. The residual solution is a clear non-viscous liquid at 125° C. The solution is stable at room temperature and at an elevated temperature of 125° C. for more than 30 days.

EXAMPLE 5

Example 4 is repeated except that in place of the diethyl sulfoxide is substituted an equal quantity of cyclopentyl sulfoxide, $C_5H_{10}SO$. The residual solution is a clear liquid at 125° C. and is stable both at room temperature and 125° C. for more than 30 days.

EXAMPLE 6

In this example the procedure described in Examples 3, 4 and 5 above is repeated using instead of the solvents specified in the above examples several other similar sulfur-containing organic compounds, chosen because of their potential utility as solvents for a metal lactam. The proposed solvents and the manner in which they perform at 100° C. are listed below:

phenyl sulfonamide.—Produced a two phase mixture, one liquid and one solid.
N,N-dimethyl p-toluene sulfonamide.—Produced a two phase mixture, one liquid and one solid.
N,N-dimethyl methyl sulfonamide.—Produced a two phase mixture, one liquid and one solid.
butylmercaptan.—Produced a gummy, viscous mixture with dispersed solids.
diphenyl sulfide.—Produced a white flocculent precipitate.
dibutyl sulfide.—Produced a white flocculent precipitate.
diphenyl disulfide.—Produced a white flocculent precipitate.

By comparison, the solvents included within the scope of the present invention produce clear solutions at the same temperatures.

EXAMPLE 7

To 3250 parts of 10 micron anhydrous silica having an average particle size of 2.1 microns is added 10 parts of 3-aminopropyl triethoxysilane. The two materials are dry blended for 25 to 30 minutes at 110° C., after which time the aggregates are redispersed by ball milling. To 2,250 parts of molten ε-caprolactam in an atmosphere of dry nitrogen is added the treated silica, 28 parts of an 80/20 mixture of 2, 4- and 2, 6-toluene diisocyanate (TD-80) and 0.2 parts of triethylenediamine (Dabco). Also added is 28 parts (12 mmoles/mole) of magnesium bromide. The mixture is held at 120° C. and gaseous by-products removed by stripping at a reduced pressure of about 6 mm. Hg. The stripping is contnued until 500 parts of caprolactam are also removed. The vacuum is released and replaced by a nitrogen blanket. The slurry is heated to 175° C., and introduced into a mold through a mixing head which adds magnesium caprolactam dissolved in dimethyl sulfoxide. The catalyst solution is metered into the monomeric slurry at a rate which will provide 7 mmoles of magnesium caprolactam per mole of monomer. The mold is preheated to 175° C. and maintained at or near this temperature for 10 minutes after casting, after which time the monomeric slurry has solidified. Upon opening the mold, a smooth solid sheet having no voids or bubbles is obtained. The sheet is completely polymerized and mechanically isotropic.

EXAMPLE 8

The procedure described in Example 7 is followed except that no magnesium bromide is added to the monomer slurry and sodium caprolctam is used as the catalyst in place of the magnesium caproplactam. The sodium caprolactam is added to the monomer slurry in the form of a 33% solution in dimethyl sulfoxide. The polymeric sheet is similar in all respects to the polymerized sheet produced in Example 7.

EXAMPLE 9

To 2000 parts of molten ε-caprolactam in an atmosphere of dry nitrogen is added 25 parts of an 80/20 mixture of 2, 4- and 2, 6-toluene diisocyanate. The mixture is held at 120° C., then heated to 175° C. and cast into a mold through a mixing head which is used to meter a 33% solution of sodium caprolactam dissolved in dimethyl sulfoxide into the monomer. The catalyst solution is added in a quantity which provides 10 mmoles of sodium caprolactam per mole of monomer in the reactant mixture. The mold is preheated to 175° C. and maintained at or near this temperature for 5 minutes, after which time the material has solidified. Upon removal from

What is claimed is:

1. A solution of a metal lactam dissolved in a disubstituted sulfoxide of the formula

where R and R₁ can be any monovalent hydrocarbon radical and where the R's can be joined together to form a heterocyclic ring, in the substantial absence of a lactam.

2. A solution according to claim 1 wherein said metal lactam is a sodium lactam.

3. A solution according to claim 1 wherein said metal lactam is a magnesium lactam.

4. A solution according to claim 1 wherein said R and R₁ groups of said disubstituted sulfoxide are phenyl groups or alkyl groups having up to four carbon atoms.

5. A solution according to claim 1 wherein said disubstituted sulfoxide is dimethylsulfoxide.

6. A solution according to claim 1 wherein said solution is liquid at 100° C.

7. A process for preparing a solution consisting essentially of a metal lactam in a disubstituted sulfoxide of the formula

where R and R₁ can be any monovalent hydrocarbon radical and where the R's can be joined together to form a heterocyclic ring, comprising reacting a metal or metal compound with a substantially equivalent amount of a lactam in the presence of said disubstituted sulfoxide.

8. A process according to claim 7 wherein said metal compound is a metal hydride, metal hydroxide, metal alkyl or metal alkoxide.

9. A process according to claim 7 wherein said disubstituted sulfoxide is a liquid at 100° C.

10. A process according to claim 7 wherein said metal compound is a sodium or magnesium alkoxide.

11. A process according to claim 10 wherein said sodium or magnesium alkoxide is reacted with caprolactam in the presence of a disubstituted sulfoxide of the formula

where R and R₁ can be phenyl or alkyl having up to four carbon atoms.

12. A process according to claim 11 wherein said disubstituted sulfoxide is dimethyl sulfoxide.

13. In a base-catalyzed, substantially anhydrous mass polymerization of a lactam employing a metal lactam polymerization catalyst, the improvement comprising dissolving said metal lactam polymerization catalyst in a disubstituted sulfoxide of the formula

where R and R₁ can be any monovalent hydrocarbon radical and where the R's can be joined together to form a heterocyclic ring, in the substantial absence of the lactam, prior to adding said metal lactam to molten monomeric lactam.

14. A process according to claim 13 wherein an inorganic filler material and a polymerization initiator are added to said monomeric lactam before said metal lactam polymerization catalyst is added.

15. A process according to claim 13 wherein a reinforcing adduct and a polymerization initiator are added to said monomeric lactam before said metal lactam polymerization catalyst is added.

16. A process according to claim 13 wherein said metal lactam polymerization catalyst is sodium or magnesium caprolactam.

17. A process according to claim 13 wherein said disubstituted sulfoxide is a liquid at 100° C.

18. A process according to claim 13 wherein said disubstituted sulfoxide is dimethyl sulfoxide.

References Cited

UNITED STATES PATENTS

| | | |
|---|---|---|
| 3,342,783 | 9/1967 | Schlack. |
| 3,359,227 | 12/1967 | Amann. |
| 2,806,829 | 9/1957 | Capps _____ 260—30.8 |
| 3,017,392 | 1/1962 | Butler. |
| 3,017,391 | 1/1962 | Mottus. |
| 3,018,273 | 1/1962 | Butler. |

FOREIGN PATENTS

| | | |
|---|---|---|
| 676,302 | 12/1963 | Canada. |

OTHER REFERENCES

Chalmers, Paint Manufacture, February 1966, pp. 36–40.

ALLAN LIEBERMAN, *Primary Examiner.*

H. H. FLETCHER, *Assistant Examiner.*

U.S. Cl. X.R.

252—431; 260—37, 78